R. H. ROSENBERG.
UNIVERSAL JOINT.
APPLICATION FILED AUG. 18, 1916.

1,223,524.

Patented Apr. 24, 1917.

INVENTOR:
Ralph Rosenberg,
By Simon Hall Atty.

UNITED STATES PATENT OFFICE.

RALPH H. ROSENBERG, OF BOWLING GREEN, OHIO, ASSIGNOR TO THE UNIVERSAL MACHINE COMPANY, OF BOWLING GREEN, OHIO, A CORPORATION.

UNIVERSAL JOINT.

1,223,524.  Specification of Letters Patent.  Patented Apr. 24, 1917.

Application filed August 18, 1916. Serial No. 115,569.

*To all whom it may concern:*

Be it known that I, RALPH H. ROSENBERG, a citizen of the United States, residing at Bowling Green, in the county of Wood and State of Ohio, have invented certain new and useful Improvements in Universal Joints; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to universal joints especially adapted for use in connection with automobiles, and is designed to furnish a construction of extreme shaft-flexibility and extensibility, and in which the waste and escape of the lubricant is entirely avoided.

To these ends my device consists of the devices, construction and arrangement of parts hereinafter described, and illustrated in the accompanying drawings, in which—

Figure 1:
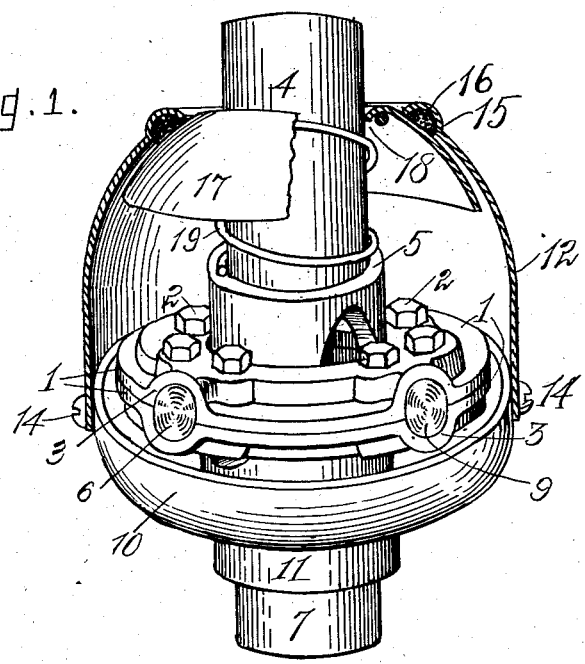
Figure 2:
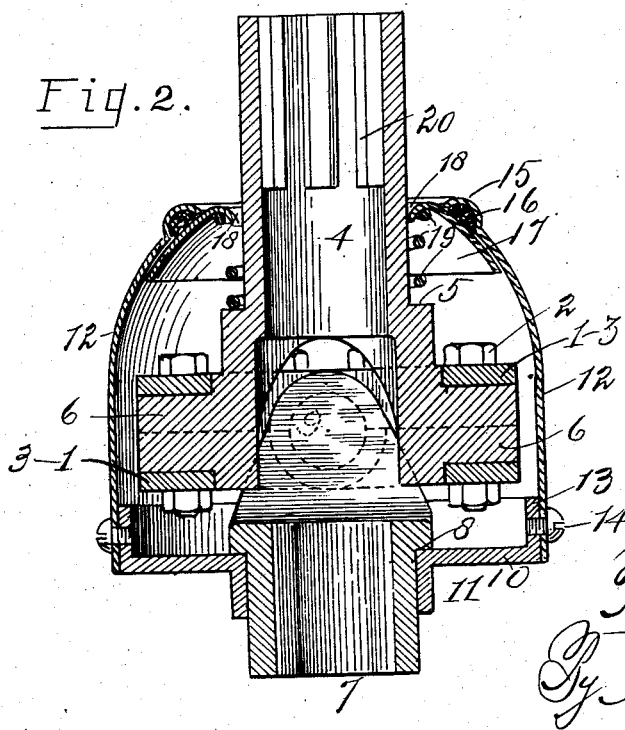

Figure 1 is a perspective view of my joint with a portion of the boot or shell hereinafter referred to broken away, and Fig. 2, a central longitudinal sectional elevation of my device.

Like numerals of reference indicate like parts in both views.

In the drawings, 1—1 are flat rings secured together side by side by bolts 2, the rings having coincident enlargements in which are opposed semi-cylindrical depressions which afford four bearings, 3, disposed at right angles to each other. 4 is a shaft-member the inner end of which is enlarged to form a shoulder 5 and having a bifurcation terminating in two oppositely projecting gudgeons or trunnions 6 journaled in two of the bearings 3. The other shaft-member 7 is enlarged at its inner end to form a shoulder 8 and is bifurcated, as shown, the bifurcations terminating in gudgeons or trunnions 9 journaled in the remaining two opposite bearings 3. It will now be seen that the two shaft-members 4—7, one being the driving the other the driven member, may, within the limits permitted by the rings, assume any desired angle to each other and in any required direction from the normal axis of the shaft-members.

The joint above described is inclosed in a casing which, while not interfering with the free relative movement of the driving and driven shaft-members, protects the joint from dust and dirt and prevents the escape of the lubricant. This casing consists of a flanged plate 10 having through its center a hole with a surrounding boss 11 which fits with a tight fit the shaft-member 7 and which sets snugly against the shoulder 8. 12 is a cup-shaped sheet metal shell the rim of which fits closely upon the flanged rim 13 of the plate 10, the overlapping rim of the part 12 being secured in place by a series of screws 14. Through the center of the shell 12 is a hole through which the shaft-member 4 passes and which is of sufficient diameter to permit the necessary deflection of the shaft-member 4. Around the interior of the margin of this hole is an annular channel 15 in which is contained packing material 16. The interior of the cup-like shell at this point is spherical. 17 is an internal cap of sheet metal, shaped as the segment of a sphere, its external surface having the same radius as the internal surface of the spherical portion of the shell 12. Through the center of the part 17 is a hole having a lip or flange 18 which fits with a close but sliding fit upon the shaft-part 4. Surrounding the shaft-part 4 is a stout coiled spring 19, one end of which rests against the shoulder 5 the other end pressing outwardly against the inner side of the segmental cap 17, so that the outer surface of the cap is constantly pressed against the packing material 16.

One or both of the shaft-members 4—7 may be tubular and internally splined or grooved, as at 20 to slidably and rotatably engage a companion shaft-member, whereby the requisite shaft-extensibility is attained.

It will now be seen that the casing consisting of the parts 10—12 is rigid upon the shaft-member 7 and that the cap 17, which completely and tightly closes the chamber of the shell, accommodates itself to the variations of the angular relations of the driving and driven shaft-members.

Having described my invention, what I claim and desire to secure by Letters Patent, is—

1. A universal joint structure comprising driving and driven shaft-members, connections between the adjoining ends of the shaft-members which permit their relative angular movement, a plate having a flanged margin and having therethrough a hole the margin of which tightly embraces one of said shaft-members, a cup-shaped shell having its rim secured to said flange, the opposite end of the shell being spherically curved and having therethrough a hole through which passes the other shaft-member, said shell having an internal annular groove surrounding said latter hole; packing in said groove, a spherically curved closure for said hole, said closure being centrally and slidably mounted upon said last mentioned shaft-member, and a spring engaged with said shaft-member for pressing said closure outwardly against said packing.

2. A universal joint structure comprising driving and driven shaft-members, connections between the adjoining ends of the shaft-members which permit their relative angular movement, one of said shaft-members being adapted to slide longitudinally upon and to revolve with a corresponding shaft-member, a plate having a flanged margin and having therethrough a hole the margin of which tightly embraces one of said shaft-members, a cup-shaped shell having its rim secured to said flange, the opposite end of the shell being spherically curved and having therethrough a hole through which passes the other shaft-member, said shell having an internal annular groove surrounding said latter hole, packing in said groove, a spherically curved closure for said hole, said closure being centrally and slidably mounted upon said last mentioned shaft-member, and a spring engaged with said shaft-member for pressing said closure outwardly against said packing.

In testimony whereof I affix my signature in presence of two witnesses.

RALPH H. ROSENBERG.

Witnesses:
C. V. URSCHEL,
G. F. GOMERSALL.